(12) United States Patent
Roth et al.

(10) Patent No.: US 8,254,671 B1
(45) Date of Patent: Aug. 28, 2012

(54) SYSTEM AND METHOD FOR SHOT BOUNDARY DETECTION IN VIDEO CLIPS

(75) Inventors: Tim H. Roth, Seattle, WA (US); Manish S. Kulkarni, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 619 days.

(21) Appl. No.: 12/466,053

(22) Filed: May 14, 2009

(51) Int. Cl.
*G06K 9/00* (2006.01)
*G06K 9/34* (2006.01)

(52) U.S. Cl. .................................. 382/165; 382/168

(58) Field of Classification Search .......... 382/162, 382/164, 165, 168, 170, 172, 173, 235, 236; 375/240.01, E7.202; 348/97, 537; 345/3.1–3.3; 358/522
See application file for complete search history.

(56) References Cited

U.S. PATENT DOCUMENTS

| | | | | |
|---|---|---|---|---|
| 4,847,677 A * | 7/1989 | Music et al. | ............ | 375/240.01 |
| 5,774,593 A * | 6/1998 | Zick et al. | ............ | 382/236 |
| 5,874,988 A * | 2/1999 | Gu | ............ | 348/97 |
| 6,411,730 B1 * | 6/2002 | Bartell et al. | ............ | 382/168 |
| 6,559,837 B1 * | 5/2003 | Lasneski et al. | ............ | 345/204 |
| 7,088,856 B2 * | 8/2006 | Lee et al. | ............ | 382/168 |
| 7,177,470 B2 | 2/2007 | Jasinschi et al. | | |
| 7,336,890 B2 | 2/2008 | Lu et al. | | |
| 2001/0036312 A1 * | 11/2001 | Shigeta et al. | ............ | 382/168 |
| 2007/0025614 A1 | 2/2007 | Qian | | |
| 2008/0232687 A1 | 9/2008 | Petersohn | | |
| 2009/0097572 A1 | 4/2009 | Connery et al. | | |

OTHER PUBLICATIONS

Boon-Lock Yeo and Bede Liu, "Rapid Scene Analysis on Compressed Video," IEEE Transactions on Circuits and Systems for Video Technology, vol. 5, No. 6, Dec. 1995.
Rainer Lienhart, "Comparison of Automatic Shot Boundary Detection Algoirthms," Microcomputer Research Labs, Intel Corporation, Santa Clara, CA 95052-8819, ETATS-UNIS, 1998 , vol. 3656, pp. 290-301.
Manjunath, et al., "Introduction to MPEG-7; Multimedia Content Description Interface," Copyright 2002 by John Wiley & Sons Ltd.

* cited by examiner

*Primary Examiner* — Amir Alavi
(74) *Attorney, Agent, or Firm* — Robert C. Kowert; Meyertons, Hood, Kivlin, Kowert & Goetzel, P.C.

(57) ABSTRACT

A system and method for detecting shot boundaries in video clips may generate a color frequency histogram for each tile of each frame of the video clip, according to a regular grid. The method may include comparing histograms of a given frame to corresponding histograms of an adjacent frame and computing a divergence descriptor for the given frame dependent on the average difference between the histograms. Various heuristics may be applied to the descriptor for each frame and the computed average descriptor of two or more leading or trailing frames to detect a shot boundary or another type of divergence between frames. A GUI may provide tools usable to identify clips on which to apply shot boundary detection and mechanisms to specify parameter values of the operation. The method may be implemented by program instructions stored on a computer readable medium and executable by one or more CPUs and/or GPUs.

24 Claims, 6 Drawing Sheets

SYSTEM AND METHOD FOR SHOT BOUNDARY DETECTION IN VIDEO CLIPS

BACKGROUND

Description of the Related Art

Various operations of a video editing or video analysis application may make use of information identifying shot boundaries in video clips. Such applications sometimes include shot boundary detection capability themselves. Shot boundary detection is typically performed in two stages. In the first stage, one or more descriptors (e.g. for each frame of a video clip) are extracted from the video clip and are stored (e.g., in a database). In the second stage, the frame-to-frame change in these descriptors is analyzed using some sort of a difference metric. Several examples of such descriptors and metrics, and their use in detecting shot boundaries and other transitions between frames of a video clip, are described in the book *Introduction to MPEG-7*, edited by Manjunath, et al, published by John Wiley & Sons Ltd., 2002. This book also includes examples of descriptor computations (i.e. extraction of metadata from video clips) and experimental results on retrieval effectiveness on a controlled data set that comprises still images, stock photos, TV and animation screen shots, etc.

Different kinds of descriptors and analysis methods can be used to detect shot boundaries, with varying results. Some of the descriptors and analysis methods can be quite complex, requiring expensive computations and/or large amounts of storage. The MPEG-7 standard defines the syntax and associated semantics of several standard descriptors. Some of the descriptors defined by the standard include a Color Space Descriptor (e.g., RGB, YCbCr, HSV, HMMD), a Color Quantization Descriptor (which specifies partitioning of the selected color space into discrete bins), and a Scalable Color Descriptor (which is derived by extracting, normalizing, and non-linearly mapping histogram values from a color histogram defined in HSV color space with fixed color space quantization into a four-bit integer representation). In some cases, the analysis methods employed in shot boundary detection are simple, but the descriptors are quite large, requiring significant space in a database to store them.

The quality of the descriptors and analysis methods can be measured in terms of the success rate in finding shot boundaries and ignoring false positives. Typically, shot boundary detection methods based on color differences between adjacent frames of a video clip may apply a pre-defined threshold to the differences between the frames. However, it is difficult to define a single color difference threshold for such methods that can be applied to video clips with widely varying content and that yields high success rates in shot boundary detection with few false positives.

SUMMARY

A system and method for detecting shot boundaries in video clips may include one or more pre-processing operations, in which metadata associated with the video clip is generated, and an analysis operation, in which the metadata is analyzed to detect shot boundaries and/or other types of divergences between frames of the video clip. The method may include accessing data representing the video clip, and dividing each frame of the video clip into a plurality of tiles, according to a regular grid. In some embodiments, the method may include converting the source pixel data of the frames of the video clip into a different color space representation (e.g., a modified hue-saturation-value color space). For each of the plurality of tiles, the method may include generating a color frequency histogram for pixel values of the tile, according to this color space.

For each of the tiles in a given frame of the video clip, the method may include comparing the color frequency histogram of the tile to a color frequency histogram of a corresponding tile of an adjacent frame, and computing a difference (e.g., an absolute difference) between them. The method may also include computing a divergence descriptor for the given frame dependent on the average difference between the histograms of the corresponding tiles of the given frame and the adjacent frame.

Various heuristics may be applied to the descriptor for each frame and to the descriptors of two or more other frames (e.g., two or more frames that lead or trail the given frame in sequence in the video clip) to detect divergence spikes (e.g., normal-shaped spikes or single-sided spikes) between frames of the video clip. For example, the method may include computing an average of the descriptor values of two or more leading or trailing frames and to apply heuristics to these average descriptors and the descriptor of the given frame to detect divergence spikes and/or to determine if each of the detected divergence spikes represents a shot boundary between frames or one of a plurality of divergence types other than a shot boundary between frames.

In some embodiments, the method may include determining if the spike detected at the given frame is adjacent to another spike in the video clip, determining if the spike detected at the given frame represents a transition to or from an empty frame in the video clip, and/or determining if the spike detected at the given frame represents a fade up or fade down transition. If some of these conditions are met, or if particular combinations of these conditions are met, the method may ignore the detected spike, and may classify the divergence type for the given frame as "unknown". Otherwise, in response to determining that the spike detected at the given frame does not represent one of these divergence types other than a shot boundary, the method may include determining that the spike detected at the given frame represents a shot boundary, and classifying the divergence type for the given frame as a shot boundary. In some embodiments, the method may include storing an indication of the divergence type for subsequent use. For example, in some embodiments, the color frequency histograms and/or indications of the divergence type for each frame of the video clip may be stored in a database or other data structure for use in another video editing operation having access to this stored metadata.

In various embodiments, the methods described herein for generating metadata associated with a video clip and/or for performing shot boundary detection may be implemented as stand-alone utilities, or as components of a video analysis toolkit, video editing application, or video editing and analysis framework. A graphical user interface of such a toolkit, application, or framework may provide tools usable to identify clips on which to apply metadata generation and/or shot boundary detection and mechanisms with which a user may specify parameter values of the operations. In various embodiments, the methods described herein may be implemented by program instructions stored on a computer readable storage medium and executable by one or more CPUs and/or GPUs. For example, they may be implemented as program instructions that, when executed, implement shot boundary detection in a video editing application in response to user input. In some embodiments, the portion of an input video clip on which to apply shot boundary detection may be defined by a user, e.g., through a user interface of the video editing application. In some embodiments, various parameters of the methods described herein may be specified by the user (e.g., through such a user interface).

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As noted above, various video editing operation may make use of information identifying shot boundaries in video clips. For example, in different embodiments, shot boundary detection may serve as a building block for operations configured to provide functionality for adding or deleting scenes, shots, or other content, rearranging scenes or shot order, inserting graphics, sound, animation effects, or advertising content into logical boundaries of a video clip, analyzing visual or audio content of a scene or shot, etc. The system and methods described herein may implement shot boundary detection in video clips with a high success rate using inexpensive computations and requiring only moderate amounts of storage space in a database. In some embodiments, the techniques described herein may be implemented in a high-quality, low-cost system to provide real-time video analysis. In some embodiments, the methods may be configured to detect hard cuts as well as other types of transitions between sequences of video frames.

As used herein, the term "shot" may refer to a sequence of continuous video frames that run for an uninterrupted period of time. A shot is generally filmed with a single camera, without turning the camera off during the frame sequence. In general, a "scene" in a video clip may include one or more shots. As used herein, the term "hard cut", or simply "cut", may refer to a sudden change from one shot to another within a video clip, while the term "transition" may refer to a gradual change from one shot to another. There are various types of transitions such as fades, cross-fades, wipes, etc. As used herein, the term "false positive" may refer to an incorrectly identified cut or transition (i.e. a difference between two frames that has been incorrectly identified as representing a cut or transition). In some embodiments, the system and methods described herein may provide shot boundary detection with high rates of detection for true cuts and a low incidence of false positives.

As noted above, shot boundary detection may be performed in two stages. In the first stage, one or more descriptors may be extracted from the video clip and stored for later analysis (e.g., in a database). In the second stage, the frame-to-frame changes (also known as divergences) in the descriptors may be analyzed using some type of difference metric. The system and methods described herein may include the generation of a descriptor that is inexpensive to compute and that is compact, so that the space required to store it in a database is minimized. The system and methods described herein may include associated analysis methods (i.e. methods for analyzing these descriptors) that result in a high success rate and a minimum number of false positives.

Figure 1:
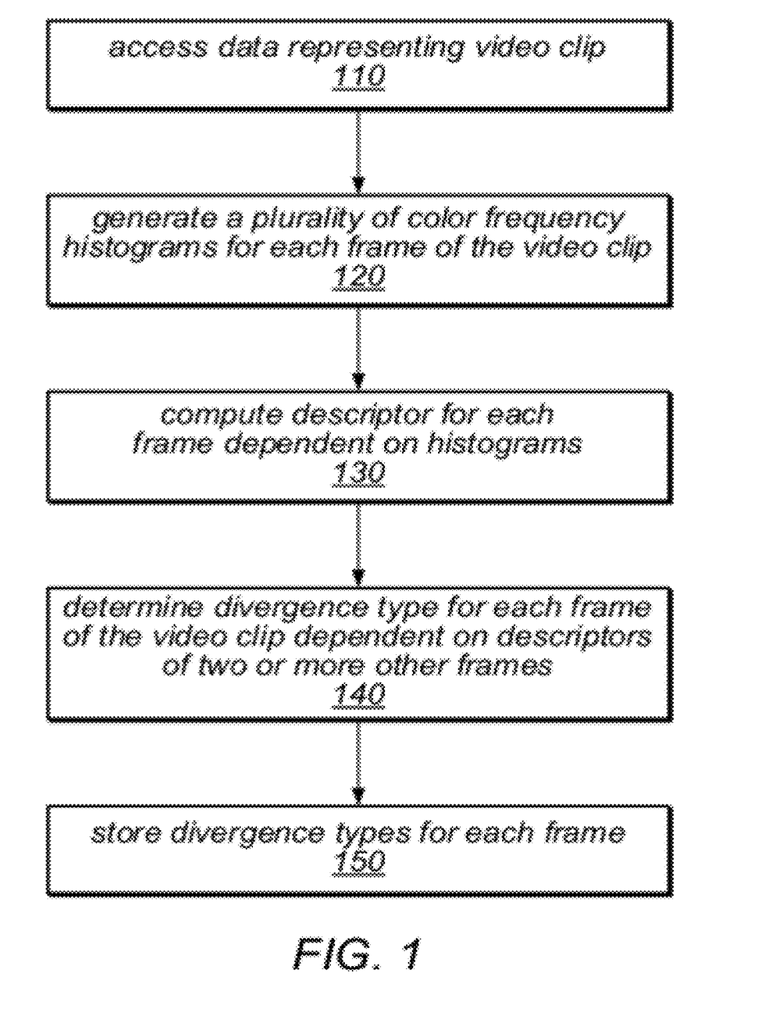
FIG. 1 is a flow diagram illustrating a method of determining types of divergences between frames in a video clip, according to various embodiments.

FIG. 1 is a flow diagram illustrating a method of determining types of divergences (such as shot boundaries) between frames in a video clip, according to various embodiments. As shown in this example, the method may include a two-step approach for extracting a descriptor from each video frame, followed by an analysis of the change in the descriptors for adjacent frames. Characteristics of this approach may include the choice of the color space for the descriptor. In some embodiments, an appropriate choice of color space may enable the descriptors to be small, yet of high quality. Similarly, in some embodiments, the analysis algorithms applied to the descriptors may be simple enough to enable high-performance, yet may yield a high success rate in detecting shot boundaries.

As shown in the example illustrated in FIG. 1, the method may include accessing data representing a video clip, as in 110. This data may be accessed in response to being imported into an application configured for video editing, or may be resident in memory accessible to such an application as a result of being imported previously, or as a result of being created and/or modified by the application prior to the current shot boundary detection operation. Note that, as used herein, the term "video editing application" may refer to an application that is specifically directed to video editing, or to any application that includes a video editing component, according to various embodiments. The data accessed may represent a whole video clip or a portion of a clip to which a shot boundary detection operation is to be applied, in different embodiments. For example, in some embodiments, a user may select a portion of a video clip on which to perform shot boundary detection using a selection tool of a video editing application to identify a beginning and ending frame of the operation, or a portion of a timeline associated with a video clip. In some embodiments, the user may also select various parameters of the shot boundary detection operation, as described in more detail herein.

Figure 2:
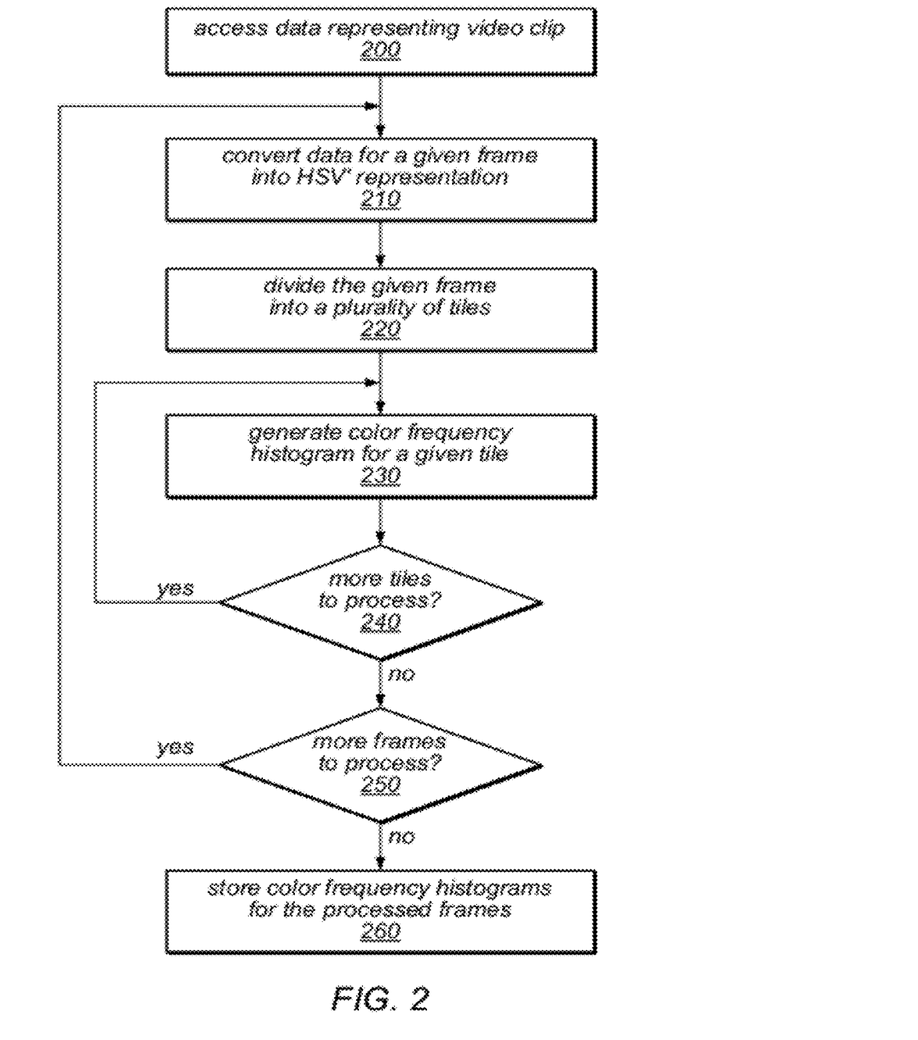
FIG. 2 is a flow diagram illustrating a method for generating metadata associated with a video clip, according to one embodiment.
Figure 3:
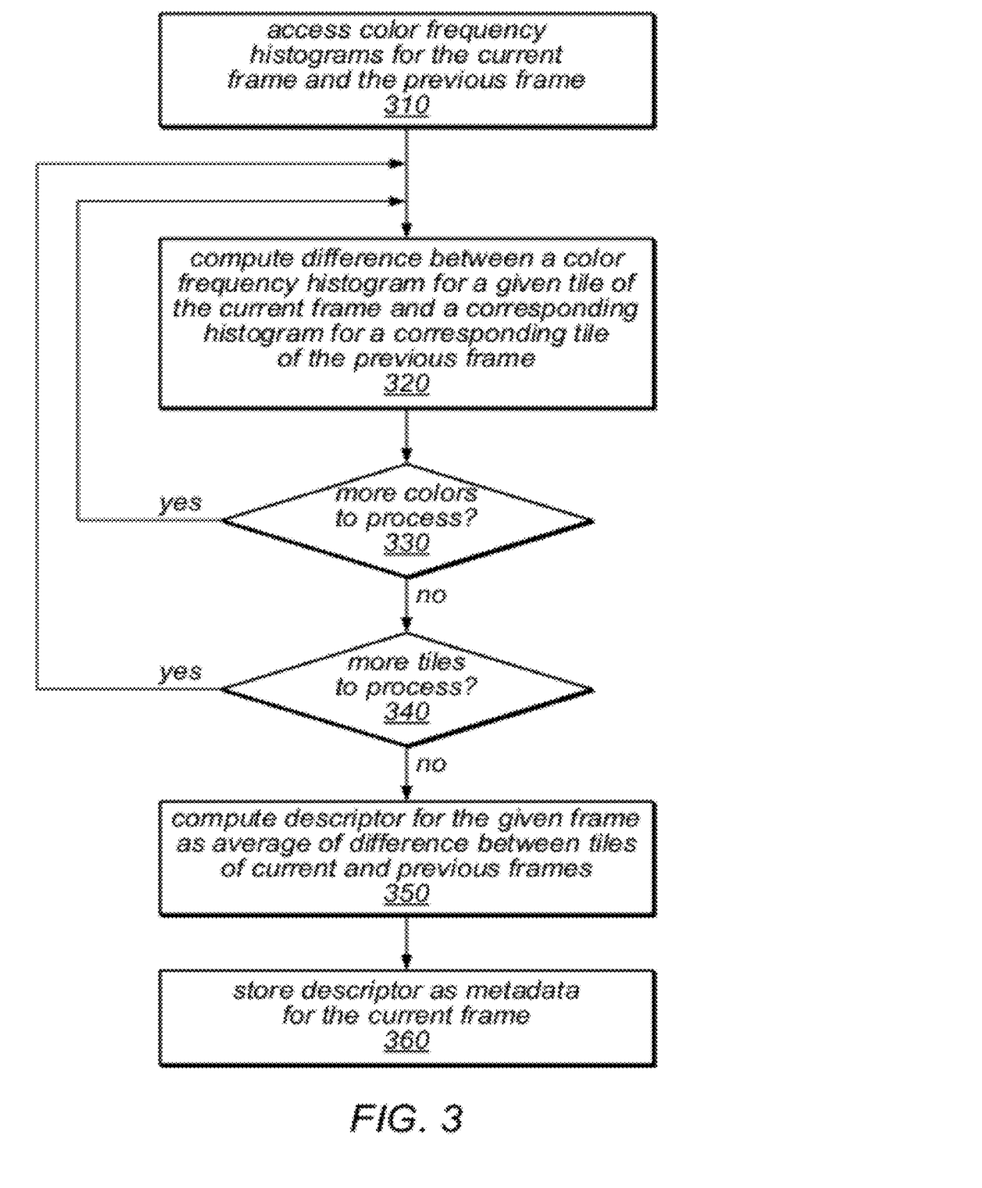
FIG. 3 is a flow diagram illustrating a method for determining a descriptor for a frame of a video clip, according to one embodiment.

As shown in the example illustrated in FIG. 1, the method may include generating a plurality of color frequency histograms for each frame of the video clip, as in 120. One method for generating this metadata is illustrated in FIG. 2 and described in more detail below. The method may also include computing a descriptor for each frame, dependent on the generated metadata (e.g., the histograms), as in 130. One method for computing the descriptor for a frame is illustrated in FIG. 3 and described in more detail below.

As shown in the example illustrated in FIG. 1, the method may include determining a divergence type for each frame of the video clip, dependent on the descriptors of two or more other frames (e.g., leading or trailing frames) of the clip. For example, for each frame of the video clip, the method may include applying one or more heuristics to the descriptors of the current frame, two or more leading edge frames, and/or two or more trailing edge frames to distinguish between true shot boundaries, fade-up or fade-down operations, and/or other types of transitions between frames in a video clip. These heuristics may in some embodiments be configured to detect a high percentage of true shot boundaries, while ignoring other transitions that might have been detected as false positives using other approaches. In the example illustrated in FIG. 1, the method may include storing the divergence type associated with each frame, as in 150. For example, the method may include storing a descriptor for each frame indicating whether or not a pair of frames comprising the current frame and a previous frame corresponds to a shot boundary.

FIG. 2 is a flow diagram illustrating a method for generating metadata associated with a video clip, according to one embodiment. Specifically, this method may be configured to generate multiple color frequency histograms for each frame of the video clip. As described above, this metadata may be subsequently processed to generate a descriptor for each frame, which may then be used to detect shot boundaries, in some embodiments. In this example, the method may include accessing data representing a video clip, as in 200. As previously described, such data may be accessed in response to being imported into an application configured for video editing, or may be resident in memory accessible to such an application as a result of being previously imported, created and/or modified by the application prior to the current metadata generation operation. Again, the data accessed may represent a whole video clip or a portion of a clip to which a metadata generation operation is to be applied, in different embodiments.

In this example, the method may include, for a given frame, converting data representing the frame (i.e. the source pixel data) into another color space representation, as in 210. For example, the source pixel data may be converted into pixel values associated with a modified hue-saturation-value (HSV) color space, referred to herein as HSV' color space. This color space may be similar to a standard HSV color space, except that a gamma function may be applied to the value term of a corresponding HSV representation in order to more widely distribute values in the V channel across the available range of values. As shown in FIG. 2, the method may include dividing the given frame into a plurality of tiles, as in 220. For example, the frame may be divided according to a regular grid, such that each tile includes an equal number of pixels in width and height.

In this example, the method may include, for each tile, quantizing each color into a subset of the entire range of possible HSV' colors and building a frequency histogram of each HSV' color found in the tile. This is illustrated in FIG. 2 as the operation in 230 and the feedback loop from 240 to 230 to repeat the operation in 230 for each tile in the frame.

Once histograms have been generated for all of the tiles of the given frame, shown as the negative exit from 240, if there are more frames of the video clip to process, the operations in 210-240 may be repeated for each other frame. This is shown in FIG. 2 as the feedback loop from 250 to 210. Once all of the frames of the video clip have been processed, shown as the negative exit from 250, the method may include storing the color frequency histograms for the frames of the video clip, as in 260. For example, in some embodiments, the resulting histograms may be stored in a database or other data structure, which may include some type of back-up storage for persistence of the metadata.

Note that while the method illustrated in FIG. 2 includes converting data for each frame into HSV' color space one at a time as each frame is being processed, in other embodiments, a conversion operation may be applied to all of the frames of the video clip (e.g., in a batch operation) prior to the processing of any frames to generate color frequency histograms. Alternatively, in other embodiments, rather than converting the source pixel data of an entire frame before processing each tile to generate the histograms, the method may include converting the source pixel data of each tile to HSV' color space as the tile is being processed.

FIG. 3 is a flow diagram illustrating a method for determining a descriptor for a frame of a video clip, according to one embodiment. In this example, the method may include accessing color frequency histograms, such as those described above, for the current frame and the previous frame in sequence in the video clip, as in 310. In some embodiments, multiple color frequency histograms may have been generated in response to invocation of a shot boundary detection operation, as described herein. In other embodiments, the color frequency histograms may have been generated in a pre-processing operation and/or may have been supplied with the video clip as an input to a video editing application configured to perform various operations dependent on such metadata.

As shown in 320 of FIG. 3, the method may include computing the difference between a color frequency histogram of a given tile of the current frame and a corresponding color frequency histogram (i.e. a histogram associated with the same color) for a corresponding tile of the previous frame (e.g., a tile in a similar position as the given tile within the previous frame). In this example, such a computation may be repeated for each color of the given tile (shown as the feedback loop from 330 to 320) and for each tile of the current frame (shown as the feedback loop from 340 to 320). Once all colors and tiles have been processed (shown as the negative exit from 340), the method may include computing a descriptor for the current frame as an average of the differences (e.g., the absolute differences) between corresponding tiles of the current frame and the previous frame, as in 350. This descriptor (a single indicator representing the difference between the current frame and the previous one) may in some embodiments be stored as metadata associated with the current frame, as in 360. In other embodiments, the descriptor may not be preserved as part of the metadata associated with the video clip. As described in more detail below, in some embodiments, the descriptors associated with multiple frames of a video clip may be analyzed to detect shot boundaries and/or other types of transitions between frames of the video clip.

In various embodiments, the method may include storing the results of each computation for further processing and/or aggregating the results as each color and/or tile is processed. For example, in some embodiments, the method may include maintaining a running aggregate difference between a tile in the current frame and the corresponding tile in the previous frame as histograms for each color are compared. In other embodiments, differences between each pair of corresponding histograms may be stored until all of the histograms for a given tile (and the corresponding tile of the previous frame) have been processed. Then these differences may be aggregated to generate a single indicator of the difference between the two tiles. In another example, in some embodiments, as processing is completed on each tile, the method may include maintaining a running average of the differences between pairs of corresponding tiles of the current frame and the previous frame. In other embodiments, an indication of the difference between each pair of tiles may be stored until all tile pairs have been processed, and then a descriptor may be computed for the current frame as an average of the differences between each of the tile pairs.

As described above in reference to FIG. 1, once these descriptors (representing frame-to-frame differences, as described above) have been determined for each of the frames of a video clip, a variety of analysis algorithms may be applied to the set of descriptors to detect shot boundaries (i.e. hard cuts) and/or transitions. Typically, cuts may be manifested as large differences in descriptors over a small number of frames, and transitions may be manifested as smaller differences in descriptors over a larger number of frames.

Unlike previous shot boundary detection approaches that compare absolute differences between descriptors of frames in a video clip to a single threshold, the methods described herein for analyzing descriptors of a video clip to detect shot boundaries may make use of the leading and trailing difference averages relative to the current frame. In other words, the methods may include computing the average difference in descriptor values for a small number of frames prior to the current frame and a separate average difference in descriptor values for the same small number of frames after the current frame. These averages, along with other constants and rules, may form the basis of the divergence analysis algorithms described herein. For example, detecting a cut may include, in part, determining that the ratio of the current difference average and the trailing difference average exceeds a threshold percentage. In another example, detecting a beginning of a transition may include, in part, determining that the ratio of the current frame difference to its trailing average difference exceeds a separate threshold percentage, and that the leading difference average exceeds the trailing difference average for one or more subsequent frames.

Figure 4:
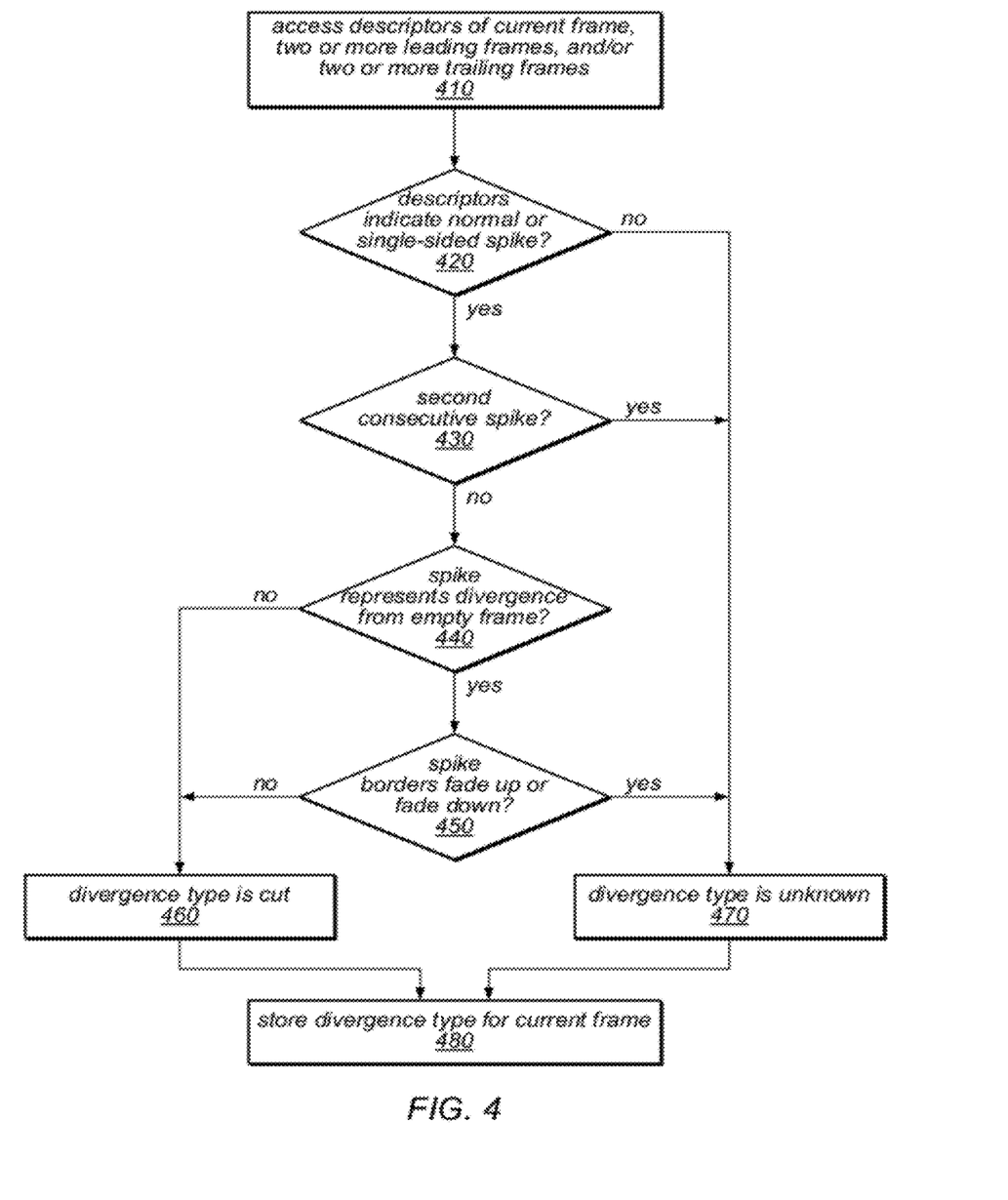
FIG. 4 is a flow diagram illustrating a method for determining a type of divergence between frames of a video clip, according to various embodiments.

FIG. 4 is a flow diagram illustrating a method for determining a type of divergence between frames of a video clip, according to various embodiments. In this example, the method may include accessing a descriptor associated with a current frame, and descriptors associated with two or more leading frames and/or two or more trailing frames, as in 410. As described above, various heuristics may be applied to these descriptors to detect shot boundaries and/or other types of transitions between frames of the video clip. As illustrated in 420 of FIG. 4, the method may include applying heuristics to the descriptors to determine if they (collectively) indicate a normal-shaped spike or single-sided spike at the current frame (e.g., between the current frame and the immediately previous frame, and/or between the current frame and the next frame in sequence in the video clip). For example, in some embodiments, the method may include computing an average of the descriptors of several frames leading the current frame and/or an average of the descriptors of several frames trailing the current frame. Additional calculations may be performed based on these averages to identify a normal-shaped or single-sided spike in the descriptor values at the current frame. In one embodiment, the ratio of the sum of these averages divided by the descriptor associated with the current frame may be compared to an empirically determined constant (e.g., a spike ratio), and/or the difference between one of these averages and the descriptor associated with the current frame may be compared to another constant (e.g., a spike minimum) to determine if there is a normal-shaped spike. In one embodiment, the ratio of the descriptor associated with the current frame divided by one of these averages may be compared with yet another constant (e.g., a single-sided spike ratio) to determine if there is a single-sided spike.

If neither type of spike is detected, shown as the negative exit from 420, the method may include classifying the divergence type for the current frame as "unknown." If, on the other hand, one of these types of spikes is detected, shown as the positive exit from 420, the method may include applying additional heuristics to determine if the spike indicates a shot boundary or another type of transition between frames. As shown in the example illustrated in FIG. 4, the method may include determining if the detected spike is a second consecutive spike, as in 430. If so, shown as the positive exit from 430, the method may include ignoring this second spike in favor of the first spike and classifying the divergence type for the current frame as unknown, as in 470.

As shown in the example illustrated in FIG. 4, the method may include determining if the detected spike represents a divergence from an empty frame (e.g., a pure black frame), as in 440. If not, shown as the negative exit from 440, the method may include classifying the divergence type for the current frame as a shot boundary, or cut, as in 460.

As shown in the example illustrated in FIG. 4, if the detected spike represents a divergence from an empty frame, shown as the positive exit from 440, the method may include determining if the detected spike borders a fade-up or fade-down transition in the video clip, as in 450. If so, shown as the positive exit from 450, the method may include ignoring this spike and classifying the divergence type for the current frame as unknown, as in 470. Note that in other embodiments, a detected spike may be disqualified as a candidate representing a shot boundary in the case that it is determined to border a fade up or fade down transition regardless of whether or not it represents a divergence from an empty frame. In still other embodiments, additional analyses may be applied to the metadata, divergence averages, and/or descriptors described herein in order to determine if a detected spike represents a shot boundary candidate or should be disqualified as a shot boundary candidate.

As shown in the example illustrated in FIG. 4, if the detected spike does not appear to represent the types of transitions considered in 430, or 450, the method may include determining that the detected spike represents a shot boundary, or cut, as in 460. Following the application of these, or similar heuristics, the method may include storing the determined divergence type for the current frame, as in 480. For example, the divergence type for each frame may be stored in association with a frame identifier, an indication of an absolute or relative position of the frame along a timeline associated with the video clip (e.g., a timestamp), and/or other metadata associated with a video clip and/or a frame thereof. In other embodiments, the method may include storing a frame identifier or timestamp associated with the current frame in a data structure configured to maintain a list of shot boundary identifiers. In various embodiments, the method illustrated in FIG. 4 may be applied to each frame of the video clip to detect shot boundaries. In some embodiments, the divergence type of each frame (or of frames associated with shot boundaries) may be stored in a database or other data structure associated with the video clip, and may be accessed by a video editing application as part of any of a variety of video editing operations for which identification of shot boundaries may be useful, as described herein.

The methods described herein for detecting shot boundaries in a video clip by the application of heuristics based on leading and trailing difference averages may be further illustrated by way of the example pseudo code shown below. In this example, it is assumed that metadata in the form of per-frame HSV' (modified hue, saturation, value color space) histograms has been generated for a target video clip. These histograms may reflect the per-frame HSV' color triplet distribution in the video clip, and may be quantized to a specific small number of H, S, and V' bins to minimize the size of the histogram. In this example, multiple histograms (n×m histograms) have been generated for each video frame, each representing one tile in a regular n×m grid imposed on the frame. In various embodiments, n and m may be any arbitrary number greater than zero and less than or equal to the image dimensions (in pixels). In practice, a value of 8 for each of n and m has been determined to be suitable in most applications. In this example, the histograms can be accessed randomly from a data store for the analysis provided by the pseudo code. In this example, it is also assumed that a sequence of descriptors (referred to in the code as "divergences") for sequential frame pairs has been computed, starting with the pair comprising the first and second frames, followed by a pair comprising the second and third frames, and so on, through a pair comprising the next-to-last and last frames. Each of these divergences represents the average of the sums of the absolute differences of the equivalent tile histograms for each frame pair, as described above. In this example, the divergences are part of an array of information (metadata) maintained for each frame pair. Each array element may be initialized to the divergence value, the associated frame number, and a divergence "type" of DIV_TYPE_UNKNOWN (see enumerations below).

Once the prerequisite environment exists, as described above, the sequence of divergences is subjected to a set of heuristics to determine shot boundaries. The following pseudo code describes the main logic for these heuristics, according to one embodiment. Note that in the pseudo code below, any line prefaced with "//" is treated as a descriptive comment.

```
// constants—determined at compile time
DIV_NEIGHBORHOOD=5
DIV_EPSILON=0.1
DIV_DELTA_MIN=1
DIV_SPIKE_RATIO=0.31
DIV_NORMAL_SPIKE_MIN=28
DIV_SINGLE_SIDED_SPIKE_RATIO=1400
DIV_VFADE_MIN_FRAMES=7
// enumerations
// divergence types
DIV_TYPE_UNKNOWN=0
DIV_TYPE_CUT=1
// V (i.e. HSV value component) fade direction
VFADE_NOT=0
VFADE_UP=1
VFADE_DOWN=2
// loop through array of divergences
for each of (index=0, while index<divergence_count, in
    steps of one)
{
    // skip the last divergence, do not allow a shot boundary
        at the last frame
    if (index=divergence_count-1) stop;
    cur_div=divergences[index]
    // divergences<=a divergence minimum are skipped
    if (cur_div<=DIV_DELTA_MIN) continue to next
        index
    // compute average of previous DIV_NEIGHBOR-
        HOOD divergences
    // notes:
    // 1) if index<DIV_NEIGHBORHOOD, average is of
    // divergences[0]—divergences[index-1]
    // 2) trailing_div_avg is not allowed to result in zero
    // force it to DIV_EPSILON if necessary to avoid divide-
        by-zero errors.
    trailing_div_avg=average    (divergences[index-DIV-
        _NEIGHBORHOOD] through divergences[index-
        1])
    // compute average of next DIV_NEIGHBORHOOD
        divergences
    // Notes:
    // 1) if index>=divergence_count-DIV_NEIGHBOR-
        HOOD, average is of
    //  divergences  [index+1]–divergences  [divergence-
        _count-1]
    // 2) leading div_avg is not allowed to result in zero
    // force it to DIV_EPSILON if necessary to avoid divide-
        by-zero errors.
    Leading_div_avg=average    (divergences[index-1]
        through    divergences[index+DIV_NEIGHBOR-
        HOOD])
```

```
// is there a "normal" spike in the divergence sequence?
normal_spike=(trailing_div_avg+leading_div_avg)/
    cur_div<=DIV_SPIKE_RATIO
    AND
    (cur_div-trailing_div_avg)>DIV_NORMAL_SPIKE
        _MIN AND
    (cur_div-leading_div_avg)>DIV_NORMAL_SPIKE
        _MIN)
// is there a "single-sided" spike in the divergence
    sequence?
single_sided_spike=(((cur_div/trailing_div_avg)>
    DIV_SINGLE_SIDED_SPIKE_RATIO AND
    (cur_div/leading_div_avg)<=DIV_SINGLE_SID-
        ED_SPIKE_RATIO) OR
    ((cur_div/leading_div_avg)>DIV_SINGLE_SID-
        ED_SPIKE_RATIO AND
    (cur_div/trailing_div_avg)<=DIV_SINGLE_SID-
        ED_SPIKE_RATIO))
if (normal_spike OR single_sided_spike)
{
    // eliminate any adjacent spikes, preferring first one
    if (divergences[index-1].type=DIV_TYPE_CUT) con-
        tinue to next index
    // look for spikes due to divergences from a pure black
        frame,
    // and disqualify any that borders a fade up before, or
        fade down after
    // Note: PureBlackOnly and DetectVFade functions are
        not documented here.//
    // The former determines whether a frame represents
        only pure HSV' black,
    // and the latter determines whether a range of frames
    // represents a "fade" of the HSV' value component-
        either up or down
    vFadeDirection=VFADE_NOT
    if (divergences[index-1].frame is PureBlackOnly ( )
        AND
    index+
        DIV_VFADE_MIN_FRAMES<divergence_count)
    vFadeDirection=DetectVFade    (divergences[index]
        .frame through
        divergences                        [index].
            frame=DIV_VFADE_MIN_FRAMES-1)
    if (vFadeDirection=VFADE_UP)
        continue to next index
    if (divergences [index].frame is PureBlackOnly ( )
        AND
    index-DIV_VFADE_MIN_FRAMES>0)
    vFadeDirection=DetectVFade   (divergences   [index].
        frame-DIV_VFADE_MIN_FRAMES+1    through
        divergences[index].frame)
    if (vFadeDirection=VFADE_DOWN)
        continue to next index
    // any spike remaining at this point qualifies as a candi-
        date-track it as a cut divergences [index]
        .type=DIV_TYPE_CUT}
    }
}
```

In the example above, the leading and trailing divergence averages are computed for the five frames before and after the current frame, as indicated by the constant DIV_NEIGHBORHOOD. Various heuristics are applied to these divergence averages, the divergence of the current frame, and the various empirically determined constants listed above in order to detect spikes in the differences between frames, and then to ignore those spikes that represent differences other than hard cuts. The remaining spikes are determined to represent true shot boundaries, in this example.

As noted above, the methods described herein may make use of a modified HSV' color space representation of each frame of the video clip. In some embodiments, this modification may be made during the construction of the color frequency histograms described above. For example, in some embodiments, a conversion may first be made from the source pixel representation of a frame (e.g., RGB color space) to a standard HSV color space representation. Before quantizing the color space to build the color frequency histograms, the value (i.e. "V") component of this HSV representation may be adjusted uniformly upward. This has been determined to improve the accuracy of the heuristics, in some embodiments. In some embodiments, a gamma function may be applied to the value component to generate the HSV' color space representation. In one embodiment, the adjustment to the value component may be implemented using a "cube root" function. For example, each V value in its original 0-255 range may be divided by the maximum of the range (255), raised to the ⅓ power (i.e. the cube root), and scaled by the maximum of the range. The result may be a value in a range of 0-1, which may be more suitable for the rest of the histogram calculations.

Example pseudo code for this operation is shown below:

$V\_range\_zero\_one = V/255.0$ $V\_adjusted = 255.0 * powf(V\_range\_zero\_one, 0.333333)$ In this example, powf represents a general math library function, typically provided by the host computing environment, to raise the first argument to the power of the second one.

In some embodiments, the methods described herein for generating metadata associated with video clips and/or for detecting shot boundaries may be implemented in one or more modules of a video analysis toolkit or another video editing framework. For example, a color analysis module of such a toolkit may provide functionality for analyzing video clips to produce metadata in the form of frequency histograms of pixel value occurrence. In another example, a shot boundary detection module of such a toolkit may be configured to compute and store descriptors for each frame and/or to determine the divergence type for each frame, based on those descriptors. In some embodiments, all individual frames of a target video may be analyzed at a sub-sampled resolution, since full resolution data may not be required for the method to work well. Note that in many cases, one-quarter resolution image data may be generally sufficient for the metadata construction described herein. In some embodiments, this resolution level may be a default resolution employed by a video editing application. In other embodiments, the user may select the resolution of the image data on which to apply the operations described herein and/or may override a default resolution level. Note that in various embodiments, the resolution level may not affect the size of the metadata produced, but may dramatically affect the time it takes to produce it. The metadata generated may include a color frequency histogram of each frame (or tile thereof), in quantized HSV space (or a modified HSV' space), with the quantizing "bin" sizes under user control. In general, if the method uses more bins, it may produce more metadata, but it may also yield better results. In practice, a relatively small number of bins may produce acceptable results for the types of video editing features described herein (e.g., shot boundary detection). In some embodiments, the toolkit may maintain persistent metadata in a binary form, e.g., using a standard STL file stream. Platform endian-ness and versioning may be supported too, so that users may manage the data incarnation and life span. As described herein, such metadata may then be analyzed in useful ways, such as by computing frame-to-frame divergence for detecting shot boundaries or for detecting frames similar to a target frame, finding specific colors in target frames, etc.

In some embodiments, shot boundary detection, as described herein, may be provided by a framework configured to support the larger context of media indexing, e.g., for Internet content. For example, a video analysis toolkit or another video editing framework may in some embodiments provide functionality suitable for use in managing metadata. Such a toolkit may in some embodiments include a shot boundary detection module (e.g., as a plug-in component), and/or other color-based search features, e.g., to find content similar to a target frame or target color. As described above, in some embodiments, users may implement various color-based analysis operations in two passes: one of which may be used to build the metadata and the other of which may be used to analyze it. This model may make it convenient to implement the persistence within a user's data backing store. In some embodiments, the toolkit may support a single pass implementation, which may be useful for a user who anticipates needing analysis results only once, and who is willing to recreate the metadata each time a new analysis is required.

As described herein, in some embodiments, each frame histogram may be implemented as a collection of per-tile histograms representing a user-controlled grid imposed on the frame. This representation may provide flexibility in the analysis phase for certain types of analyses. For example, for shot boundary detection, frame-to-frame divergence may be computed using an average of the tile divergences, resulting in dissipating the influence of certain "rogue" color effects. Other types of analysis might not benefit from this grid and averaging approach. Therefore, in some embodiments, the toolkit may support a variety of different metadata sets based on different parameters, depending on the analysis features desired by the user. In some embodiments, a video analysis toolkit may provide a graphical user interface, through which users may invoke the functionality described herein and/or may specify values of various configurable parameters employed by the video editing modules included therein.

Figure 5:
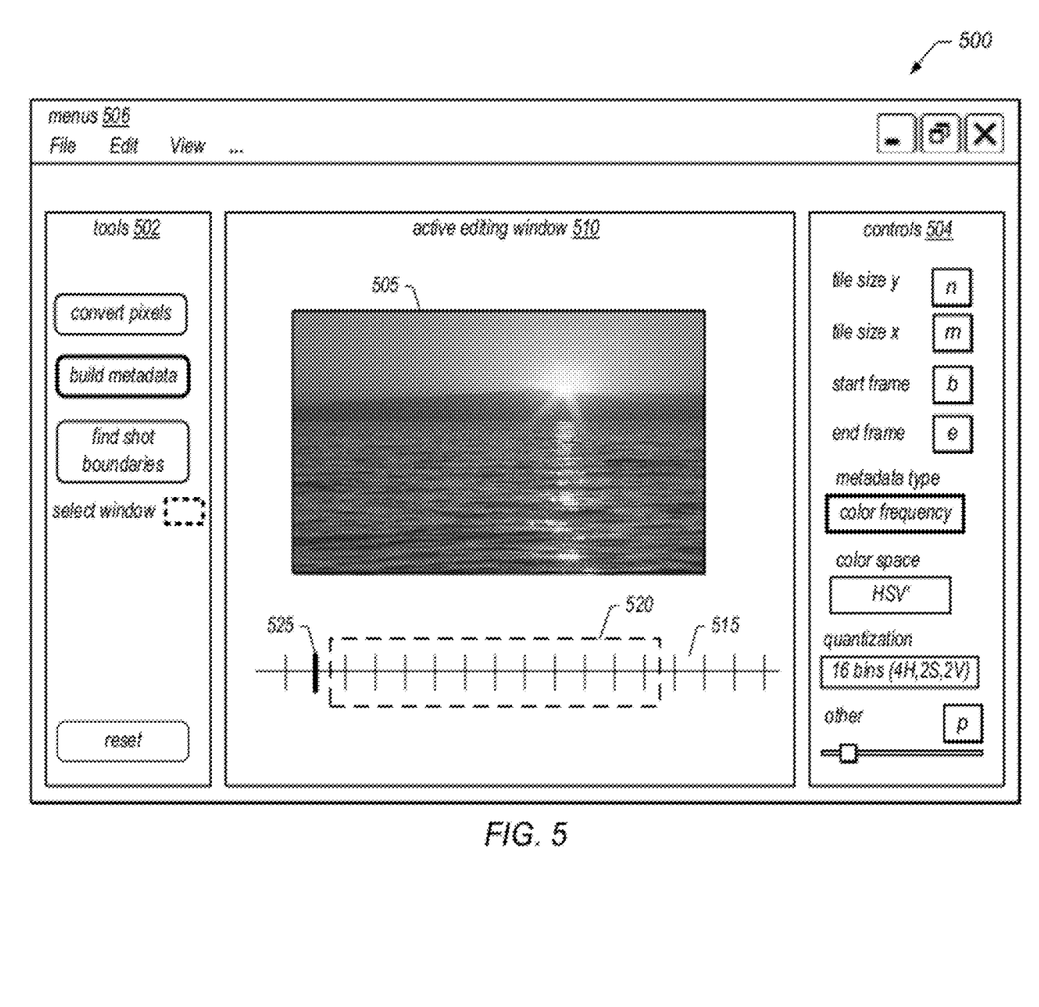
FIG. 5 illustrates a graphical user interface of a video editing application that includes shot boundary detection capability, according to various embodiments.

In different embodiments, a system (e.g., a system configured to provide a video analysis toolkit, application, or framework and to perform the video editing operations described herein) may provide various input mechanisms with which the user may indicate selections and/or input values for various parameters of those video editing operations. FIG. 5 illustrates a graphical user interface of a video editing application that includes shot boundary detection capability, according to various embodiments.

In some embodiments, a video editing application providing the shot boundary detection functionality described herein may include a graphical user interface (GUI), which may present selection tools, slider bars, pop-up menus, pull-down menus, dials, alphanumeric text entry boxes, or other mechanisms for identifying video clips or portions thereof, for selecting video editing operations to be applied to these video clips or portions thereof, or for specifying values or relative values of various configurable parameters. For example, FIG. 5 illustrates a GUI of a video editing application (or video editing module of another type of application) that may provide mechanisms for a user to apply the video editing techniques described herein and to adjust one or more parameters of these operations, according to one embodiment. In this example, a video editing module may provide a selection tool and one or more user interface elements whereby a user may select and control the application of the shot boundary detection techniques described herein. The user interface may also provide user interface elements for controlling various aspects of other video editing operations and/or for performing other video editing tasks. The user interface illustrated in FIG. 5 is provided as an example of one possible implementation, and is not intended to be limiting.

FIG. 5 illustrates an example display 500 depicting various frames that may be visible to a user during a video editing operation. In this example, the display is divided into four regions or areas: menus 506, tools 502, controls 504, and active editing window 510. Tools 502 may include one or more user-selectable user interface elements. In this example, it is this area that contains the user interface elements that a user may select to apply various video editing operations (e.g., building metadata, or finding shot boundaries) to an image. In the example illustrated in FIG. 5, the user may select a data conversion operation (e.g., "convert pixels"), a metadata building operation (e.g., "build metadata") or a shot boundary detection operation (e.g., "find shot boundaries"). If the user selects one of these operations, the user may be prompted to select a portion of the video clip 505 being edited in active editing window 510 on which to apply the operation. In this example, the user may apply a selection tool of tool area 502 to identify a portion of the video clip on which to apply the selected operation. For example, the user may select a portion of a timeline 515 associated with video clip 505 by defining a window 520 using the selection tool of tool area 502 (e.g., using a mouse, touch pad, keyboard, track ball, etc. to move a cursor across the timeline image to draw the bounding box). In this example, the image (e.g., frame) displayed in active editing window 510 may correspond to the time at position 525 on timeline 515 (shown as selected in bold). In another example, the portion of the video clip on which to apply the selected operation may be specified by a user in control area 504, as described below.

Other optional tools may be selected in tool area 502 as well, such as a reset function. While FIG. 5 illustrates several of the elements in tools 502 as buttons, other types of user interface elements, such as pop-up menus, pull-down menus, or text entry boxes, may be used to select from among one or more tools in various embodiments. In various embodiments, the reset tool illustrated in FIG. 5 may or may not be included in the user interface. Various embodiments may include other tools not shown as well, such as an "undo" tool that undoes the most recent user action in active editing window 510.

In the example illustrated in FIG. 5, controls 504 may include one or more user-modifiable controls, such as slider bars, dials, pop-up menus, alphanumeric text entry boxes, check boxes, etc., for specifying various parameters of a video editing operation that is to be applied to a video clip. In the example illustrated in FIG. 5, the user may specify (e.g., using a pull-down menu or text entry box of controls area 504), a type for an operation and/or the color space associated with an operation to be applied to video clip 505 or the portion of video clip 505 defined by selection window 520.

In embodiments that include the graphical user interface illustrated in FIG. 5, a user may initiate a shot boundary detection operation by first invoking a "build metadata" operation as the starting point of the operation. In this example, the user has selected a "build metadata" operation in tools area 502 and a metadata type for the build operation of "color frequency" in controls area 504. Selection of these elements may invoke an operation to build one or more color frequency histograms for each frame of video clip 515 or the selected portion thereof, as described above. In this example, the user may specify a quantization amount and/or a grid (tile) size from the controls area 504. The user may also specify a file name or other location at which the results (e.g., the metadata) should be output, using the "File" element of menu area 506, in this example. When the user invokes the "build metadata" command, the metadata may be generated and written to the specified file. Note that in some embodiments, the file name may include numbers indicating the quantization and tile size choices by default. In some embodiments, a progress indicator may be displayed as the metadata is generated (not shown). In some embodiments, the user may be able to specify the resolution (e.g., one-quarter resolution) of a sub-sampled version of the image data for each frame on which to apply the video editing operations illustrated in FIG. 5, e.g., via a pop-up menu, pull-down menu, alphanumeric text entry box, or other input mechanism (not shown).

In this example, the user has specified the use of the color space HSV', as described herein, which may be applied to a "convert pixels" operation (or which may have been applied to the video clip or selected portion thereof prior to invocation of the current "build metadata" operation). As noted above, in some embodiments, the portion of the video clip 505 on which to apply the "build metadata" operation may be identified by specifying a start frame and end frame in controls area 504 (e.g., by entering frame identifiers or timestamp values in an alphanumeric text entry box). For example, to apply an operation to an entire video clip, the starting frame may be frame 0, and the identifier of the ending frame may be equal to the number of frames in the clip. Any subset of these frames may be specified by entering the range of frames, in this example.

As noted above and illustrated in FIG. 5, the user may in some embodiments specify the size of the regular tiles into which each frame may be divided (e.g., for a "build metadata" or "find shot boundaries" operation, as described herein). In some embodiments, a default or fixed value for the width (x) and height (y) of each tile may represent an 8×8 grid. In other embodiments, there may not be a default value for the tile height or width, or the default value(s) may be overridden by the user by specifying them in alphanumeric text entry boxes in controls area 504, in this example. As previously noted, increasing the grid size may in some cases make certain analyses more accurate at the expense of larger metadata structures and/or storage.

As shown in FIG. 5 and noted above, the user may specify the quantization level applied to a metadata building operation (e.g., the number of bins into which each channel of the color space is to be divided when generating color frequency histograms). In one embodiment, a user may select a quantization level from a pop-up or pull-down menu with five fixed quantization levels. The values displayed in parentheses for each menu item may represent the number of discreet hue, saturation and value values maintained in the histogram. For example, FIG. 5 illustrates a selection of 16 bins, which represent the combinations of 4 discreet value ranges for hue, 2 discreet value ranges for saturation, and 2 discreet value ranges for value. In experiments, reasonable results have been produced using this quantization level, which may be the lowest quantization level supported, thus resulting in the smallest metadata structures and/or storage.

Note that as described herein (e.g., in reference to FIGS. 1-3), building metadata suitable for performing shot boundary detection on a video clip may include both the generation of multiple color frequency histograms for each frame of the video clip and the computation of a divergence descriptor for sequential frame pairs of the video clip.

In the example illustrated in FIG. 5, if the user had selected "find shot boundaries" instead of, or subsequent to, selecting "build metadata", the user may have invoked the application of various heuristics to the divergence descriptors between adjacent frames as described above (e.g., in reference to FIG. 4), to detect hard cuts, or shot boundaries. In some embodiments, the detection of each of the shot boundaries may produce a marker (e.g., "S") on the timeline 515 for each shot boundary (not shown). The user may then navigate through the markers (on the timeline view 515) to see the results. In some embodiments, these markers may be numbered (e.g., in sequence beginning with the first cut, or using an associated timestamp or other identifier), and the number associated with each marker may be displayed to give the user a frame of reference. In some embodiments, selecting (e.g., hovering over or double clicking on) the marker numbers in the timeline view 515 may display the computed divergence value for the frame at the shot boundary. In some embodiments, the "find shot boundaries" operation may produce an output file in the same folder as the input video clip, with ".scenes" or ".shots" appended to the folder or clip file name, or an output file whose name and/or location are specified using the "File" element in menus area 506. This output may be a text file, which may include a list of found cuts, one per line.

In various embodiments, control area 504 may include other input mechanisms such as pull-down menus, pop-up menus, slider bars, or other mechanisms usable to specify values of configurable parameters for video editing functions provided by the video editing application. For example, a slider bar is illustrated in controls area 504 for specifying an additional parameter of a video editing operation ("other").

In the example illustrated in FIG. 5, menus 506 may include one or more menus, for example menus used to navigate to other displays in the video editing application, open files, display or save files, undo/redo actions, view one or more selected representations of a video clip, and so on. In some embodiments, a video file (e.g., a input or output file containing video data, metadata, etc., associated with a video clip) may be identified by the user through the "File" option in menu area 506. This menu item may include, for example, a user-selectable pull-down option for importing one or more video clips from an identified file and/or for specifying and name and/or location of an output file, as described above. In the example illustrated in FIG. 5, active editing window 510 is the area in which a video clip being edited is displayed as various editing operations are performed. In various embodiments and at various times, active editing window 510 may display a portion (e.g., a frame) of an original input video clip to which an editing operation is to be applied, or a portion of a preview result video clip, an output video clip, or any intermediate video clip produced as part of the video editing operation, as described herein.

In the example illustrated in FIG. 5, menu 506 includes a "view" option. This menu item may include, for example, a user-selectable pull-down or pop-up menu usable to select which of various representations of video clip (e.g., video frames, timelines, etc.) are displayed in active editing window 510, or in another area of display 500. In other embodiments, different input mechanisms may be provided for selecting a view to be displayed, such as one or more radio buttons, alphanumeric text boxes, dials, etc. In some embodiments, one of the available viewing options may be a "split view", in which two or more representations of a video clip may be simultaneously displayed (e.g., an image of a frame of the video clip 505 and a corresponding timeline 515 may be displayed while the user applies an editing operation). In some embodiments, as the user iteratively applies the techniques described herein, the system may be configured to automatically update and/or store the data representing the results of the operation (e.g., updating metadata associated with the video clip). The system may also be configured to automatically refresh the image 505 and/or timeline 515 being displayed in response to these updates.

In some embodiments, a user may be prompted to provide one or more of the inputs described above in response to invoking an operation of the video editing application. In other embodiments, the video editing application may provide default values for any or all of these inputs. In some embodiments, the user may be allowed to override one or more default parameter values using an interface similar to that illustrated in FIG. 5.

In some embodiments, a video analysis toolkit, application, or framework may also provide a "find dissolves" operation and/or a "find shots and dissolves" operation (not shown). A "find dissolves" operation may be configured to identify patterns of divergence descriptors that indicate two or more scenes dissolving between each other. A "find shots and dissolves" operation may provide the logical combination of the results of the "find shot boundaries" and "find dissolves" operations.

In some embodiments, a "truth" file mechanism may exist to allow the user to optionally enable an accuracy-tracking feature for the "find shots" operation. A truth file may be a simple text file (e.g., a text file in the same folder as the input video clip file and/or the output metadata or shot file and having a name comprising the name of the video clip with ".truth" appended). Such a truth file may include a list of cuts that have been subjectively identified by a user. Cuts are generally straightforward to determine visually, as marked by sharp camera transitions. If this file is present, and an accuracy check is enabled the file may be parsed and the contents used to check the accuracy of the shot boundary detection results. In some embodiments, this accuracy check may create an additional output file (e.g., a text file) comprising a list of the cuts found, and a summary of the operation that includes the number of cuts found, the number of those cuts determined to be false, the number of true cuts found, and the accuracy of the operation, e.g. calculated as ((cuts found−cuts false)/(cut count). In some embodiments, the cuts found and matching a cut in the truth file may be identified on the cut list by the frame number and an indicator "C". Cuts found but not matching any cuts in the truth file may be identified on the cut list by the frame number and an indicator "FC".

Other functionality provided by a video analysis toolkit may include a "find similar to target brightness" operation, a "find similar to target color" operation, a "find most common color" operation, and/or a "find similar to target frame" operation (not shown). Any or all of these operations may make use of the metadata described herein (e.g., multiple color frequency histograms associated each frame and/or a divergence descriptor associated with each frame).

Some embodiments may include a means for accessing data representing a video clip, a means for dividing each frame of the video clip into a plurality of tiles, a means for generating a color frequency histogram for pixels of each of the tiles, and a means for computing differences between the color frequency histogram of each of the tiles and color frequency histograms of corresponding tiles in an adjacent frame of the video clip. For example, a video analysis toolkit, video editing application, or video editing and analysis framework may include a color analysis module for accessing data representing a video clip, dividing each frame of the video clip into a plurality of tiles, generating a color frequency histogram for pixels of each of the tiles, and computing differences between the color frequency histogram of each of the tiles and color frequency histograms of corresponding tiles in an adjacent frame of the video clip. The color analysis module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform accessing data representing a video clip, dividing each frame of the video clip into a plurality of tiles, generating a color frequency histogram for pixels of each of the tiles, and computing differences between the color frequency histogram of each of the tiles and color frequency histograms of corresponding tiles in an adjacent frame of the video clip. Other embodiments of the color analysis module may be at least partially implemented by hardware circuitry and/or firmware stored, for example, in a non-volatile memory.

Some embodiments may include a means for computing a descriptor for each frame of a video clip dependent on the computed differences between the tiles of the frame and the tiles in an adjacent frame, a means for determining a divergence type for each frame dependent on the computed descriptor of the frame and computed descriptors of two or more other frames, and a means for storing an indication of the divergence type of each frame in a memory for subsequent use. For example, a video analysis toolkit, video editing application, or video editing and analysis framework may include a shot boundary detection module for computing a descriptor for each frame of a video clip dependent on the computed differences between the tiles of the frame and the tiles in the adjacent frame, determining a divergence type for each frame dependent on the computed descriptor of the frame and computed descriptors of two or more other frames, and storing an indication of the divergence type of each frame in a memory for subsequent use. The shot boundary detection module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform computing a descriptor for each frame of a video clip dependent on the computed differences between the tiles of the frame and the tiles in the adjacent frame, determining a divergence type for each frame dependent on the computed descriptor of the frame and computed descriptors of two or more other frames, and storing an indication of the divergence type of each frame in a memory for subsequent use. Other embodiments of the shot boundary detection module may be at least partially implemented by hardware circuitry and/or firmware stored, for example, in a non-volatile memory.

Figure 6:
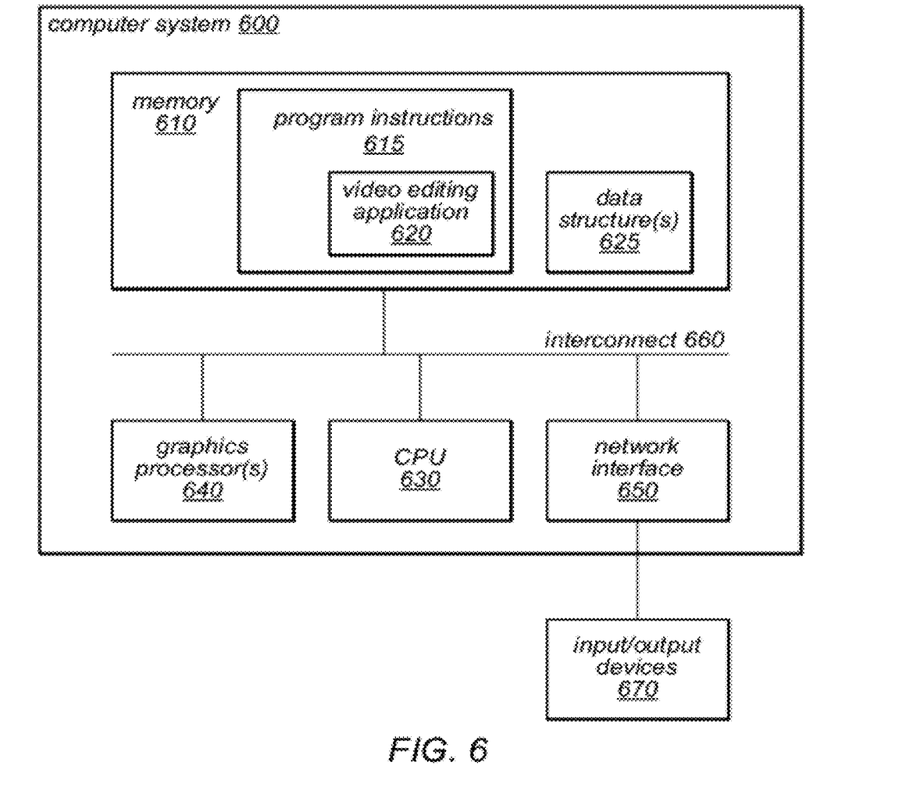
FIG. 6 illustrates a computer system configured to implement a video editing application that includes shot boundary detection capability, according to one embodiment.

The methods described herein for performing shot boundary detection and/or other video editing operations may be implemented by a computer system configured to provide the functionality described. FIG. 6 is a block diagram illustrating one embodiment of a computer system 600 configured to implement such video editing operations. A video editing application such as video editing application 620 may be configured to perform metadata building operations and/or shot boundary detection operations on video data as part of various video editing functions. For example, video editing application 620 may perform these operations as building blocks or pre-processing operations of other video editing operations (e.g., adding or deleting scenes, shots, or other content, rearranging scene or shot order, inserting graphics, sound, animation effects, advertising, analyzing visual or audio content of a scene or shot, etc.), according to various embodiments.

In some embodiments, video editing application 620 may represent (or be a module of) a video analysis toolkit or framework, as described above. In other embodiments, video editing application 620 may represent (or be a module of) various types of graphics applications, such as painting, publishing, photography, games, animation, and other applications. Video editing application 620 may include one or more components comprising program instructions that when executed on CPU 630 and/or GPU 640 cause computer system 600 to perform the video editing functions described herein (e.g., to implement a color analysis module and/or a shot boundary detection module, as described herein). Additionally, video editing application 620 may utilize a graphics processor 640 when rendering or displaying images, and/or when generating or analyzing metadata associated with a video clip, according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 640 may implement a number of graphics primitive operations in a way that makes executing them much faster than drawing directly to the screen with a host central processing unit (CPU), such as CPU 630. In various embodiments, the methods disclosed herein for generating metadata and/or the methods disclosed herein for performing shot boundary detection operations on a video clip may be implemented by program instructions configured for parallel execution on two or more such GPUs. For example, in some embodiments, color frequency histograms and/or divergence descriptors may be generated or analyzed simultaneously for two or more colors, tiles, or frames on respective ones of two or more such GPUs. The GPU 640 may implement one or more application programmer interfaces (APIs) that permit programmers to invoke the functionality of the GPU. Suitable GPUs may be commercially available from vendors such as NVIDIA Corporation, ATI Technologies, and others. Please note that functionality and/or features described herein as being part of, or performed by, video editing application 620 may, in some embodiments, be part of, or performed by, one or more graphics processors, such as graphics processor 640.

Editing of video clips, as described herein, may be implemented on various types of computer systems. Referring again to FIG. 6, computer system 600 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Video editing application 620, which may be configured to implement the video editing techniques described herein, may be provided as a computer program product, or software, that may include a computer-readable storage medium having stored thereon instructions, which may be used to program a computer system (or other electronic devices) to implement video editing, as described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 6, computer system 600 may include one or more processor units (CPUs) 630. Processors 630 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system (s) may be run on computer system 600, such as various versions of Unix, Linux, Windows™ from Microsoft Corporation, MacOS™ from Apple Corporation, or any other operating system that enables the operation of software on a hardware platform.

The computer system 600 may also include one or more system memories 610 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 600 via interconnect 660. Memory 610 may include other types of memory as well, or combinations thereof. One or more of memories 610 may include program instructions 615 executable by one or more of processors 630 to implement aspects of the video editing techniques described herein. Program instructions 615, which may include program instructions configured to implement video editing application 620, may be partly or fully resident within the memory 610 of computer system 600 at any point in time. Alternatively, program instructions 615 may be provided to GPU 640 for performing video editing operations (or portions thereof) on GPU 640 using one or more of the techniques described herein. In some embodiments, the techniques described herein may be implemented by a combination of program instructions 615 executed on one or more processors 630 and one or more GPUs 640, respectively. Program instructions 615 may also be stored on an external storage device (not shown) accessible by the processor(s) 630 and/or GPU 640, in some embodiments. Any of a variety of such storage devices may be used to store the program instructions 615 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 630 and/or GPU 640 through one or more storage or I/O interfaces including, but not limited to, interconnect 660 or network interface 650, as described herein. In some embodiments, the program instructions 615 may be provided to the computer system 600 via any suitable computer-readable storage medium including memory 610 and/or external storage devices described above. Memory 610 may also be configured to implement one or more data structures 625, such as one or more structures configured to store data representing one or more video clips, and/or to store data representing color frequency histograms, divergence descriptors, and/or other metadata associated with video clips. Data structures 625 may be accessible by processor(s) 630 and/or GPU 640 when executing video editing application 620 or other program instructions 615.

As shown in FIG. 6, processor(s) 630 may be coupled to one or more of the other illustrated components by at least one communications bus, such as interconnect 660 (e.g., a system bus, LDT, PCI, ISA, or other communication bus type), and a network interface 650 (e.g., an ATM interface, an Ethernet interface, a Frame Relay interface, or other interface). The CPU 630, the network interface 650, and the memory 610 may be coupled to the interconnect 660. It should also be noted that one or more components of system 600 might be located remotely and accessed via a network.

As noted above, in some embodiments, memory 610 may include program instructions 615, comprising program instructions configured to implement video editing application 620, as described herein. Video editing application 620 may be implemented in various embodiments using any desired programming language, scripting language, or combination of programming languages and/or scripting languages, e.g., C, C++, C#, Java™, Perl, etc. For example, in one embodiment, video editing application 620 may be JAVA based, while in another embodiments, it may be implemented using the C or C++ programming languages. In other embodiments, video editing application 620 may be implemented using specific graphic languages specifically for developing programs executed by specialize graphics hardware, such as GPU 640. In addition, video editing application 620 may be embodied on memory specifically allocated for use by graphics processor(s) 640, such as memory on a graphics board including graphics processor(s) 640. Thus, memory 610 may represent dedicated graphics memory as well as general-purpose system RAM, in various embodiments. Memory 610 may in some embodiments also include a data store configured to store video data for one or more video clips, and/or to store metadata associated with those clips, in various embodiments. Other information not described herein may be included in memory 610 and may be used to implement the methods described herein and/or other functionality of computer system 600.

Network interface 650 may be configured to enable computer system 600 to communicate with other computers, systems or machines, such as across a network. Network interface 650 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 600 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 650 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 640 may be implemented in a number of different physical forms. For example, GPU 640 may take the form of a dedicated graphics card, an integrated graphics solution and/or a hybrid solution. GPU 640 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 6, memory 610 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 640 and the rest of the computer system 600 may travel through a graphics card slot or other interface, such as interconnect 660 of FIG. 6.

Computer system 600 may also include one or more additional I/O interfaces, such as interfaces for one or more user input devices 670, or such devices may be coupled to computer system 600 via network interface 650. For example, computer system 600 may include interfaces to a keyboard, a mouse or other cursor control device, a joystick, or other user input devices 670, in various embodiments. Additionally, the computer system 600 may include one or more displays (not shown), coupled to processors 630 and/or other components via interconnect 660 or network interface 650. Such input/output devices may be configured to allow a user to interact with video editing application 620 to request various video editing operations and/or to specify various parameters, thresholds, and/or other configurable options available to the user when editing video clips using video editing application 620. It will be apparent to those having ordinary skill in the art that computer system 600 may also include numerous other elements not shown in FIG. 6.

Note that program instructions 615 may be configured to implement a video editing application 620 as a stand-alone application, or as a module of a graphics application or graphics library, in various embodiments. For example, in one embodiment program instructions 615 may be configured to implement graphics applications such as painting, publishing, photography, games, animation, and/or other applications, and may be configured to edit video clips as part of one or more of these graphics applications. In another embodiment, program instructions 615 may be configured to implement the video editing techniques described herein in one or more functions called by a graphics application executed on GPU 640 and/or processor(s) 630. Program instructions 615 may also be configured to render video or still images and present them on one or more displays as the output of a video editing operation and/or to store video data or still image data and/or metadata associated with that data in memory 610 and/or an external storage device(s), in various embodiments. For example, a video editing application 620 included in program instructions 615 may utilize GPU 640 when generating or analyzing metadata associated with a video clip, or when modifying, rendering, or displaying images of a video clip, in some embodiments.

While various video editing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method, comprising:
    using a computer to perform:
        accessing data representing a video clip;
        for a given frame of the video clip:
            dividing the frame into a plurality of tiles;
            for each of the plurality of tiles:
                generating a color frequency histogram for pixels of the tile; and
                computing a difference between the color frequency histogram of the tile and a color frequency histogram of a corresponding one of a plurality of tiles in an adjacent frame of the video clip;
        computing a descriptor for the given frame dependent on the computed differences between the plurality of tiles in the given frame and the plurality of tiles in the adjacent frame;
        determining a divergence type for the given frame dependent on the computed descriptor and computed descriptors of two or more other frames; and
        storing an indication of the divergence type for subsequent use.

2. The method of claim 1, wherein the two or more other frames comprise two or more frames leading the given frame in sequence in the video clip or two or more frames trailing the given frame in sequence in the video clip.

3. The method of claim 1, wherein said computing a descriptor comprises computing an average of the computed differences between the plurality of tiles in the given frame and the plurality of tiles in the adjacent frame.

4. The method of claim 1, wherein said determining a divergence type comprises determining an average of the computed descriptors of the two or more other frames.

5. The method of claim 4, wherein said determining a divergence type comprises determining if a divergence spike exists at the given frame dependent on the computed descriptor of the given frame and the average of the computed descriptors of the two or more other frames.

6. The method of claim 5, wherein said determining a divergence type further comprises, in response to determining that a divergence spike exists at the given frame:
    determining if the spike existing at the given frame represents one of a plurality of divergence types other than a shot boundary; and
    in response to determining that the spike existing at the given frame does not represent one of the plurality of divergence types other than a shot boundary, determining that the spike existing at the given frame represents a shot boundary.

7. The method of claim 5, wherein said determining a divergence type further comprises:
    in response to determining that a divergence spike exists at the given frame, determining if the spike existing at the given frame is adjacent to another spike.

8. The method of claim 5, wherein said determining a divergence type further comprises:
    in response to determining that a divergence spike exists at the given frame, determining if the spike existing at the given frame represents a transition to or from an empty frame.

9. The method of claim 5, wherein said determining a divergence type further comprises:
    in response to determining that a divergence spike exists at the given frame, determining if the spike existing at the given frame represents a fade up or fade down transition.

10. The method of claim 5, wherein said determining if a divergence spike exists at the given frame comprises determining whether a normal-shaped divergence spike or a single-sided divergence spike exists at the given frame.

11. The method of claim 1, wherein said generating a color frequency histogram for pixels of the tile comprises generating a color frequency histogram for pixel values according to a modified hue-saturation-value color space.

12. A non-transitory computer-readable storage medium storing program instructions computer-executable to implement:
    accessing data representing a video clip;

for a given frame of the video clip:
  dividing the frame into a plurality of tiles;
  for each of the plurality of tiles:
    generating a color frequency histogram for pixels of the tile; and
    computing a difference between the color frequency histogram of the tile and a color frequency histogram of a corresponding one of a plurality of tiles in an adjacent frame of the video clip;
  computing a descriptor for the given frame dependent on the computed differences between the plurality of tiles in the given frame and the plurality of tiles in the adjacent frame;
  determining a divergence type for the given frame dependent on the computed descriptor and computed descriptors of two or more other frames; and
  storing an indication of the divergence type for subsequent use.

13. The non-transitory storage medium of claim 12, wherein the two or more other frames comprise two or more frames leading the given frame in sequence in the video clip or two or more frames trailing the given frame in sequence in the video clip.

14. The non-transitory storage medium of claim 12, wherein said computing a descriptor comprises computing an average of the computed differences between the plurality of tiles in the given frame and the plurality of tiles in the adjacent frame.

15. The non-transitory storage medium of claim 12, wherein said determining a divergence type comprises determining an average of the computed descriptors of the two or more other frames.

16. The non-transitory storage medium of claim 15, wherein said determining a divergence type comprises determining if a normal-shaped divergence spike or a single-sided divergence spike exists at the given frame dependent on the computed descriptor of the given frame and the average of the computed descriptors of the two or more other frames.

17. The non-transitory storage medium of claim 16, wherein said determining a divergence type further comprises, in response to determining that a normal-shaped divergence spike or a single-sided divergence spike exists at the given frame:
  determining if the spike existing at the given frame represents one of a plurality of divergence types other than a shot boundary; and
  in response to determining that the spike existing at the given frame does not represent one of the plurality of divergence types other than a shot boundary, determining that the spike existing at the given frame represents a shot boundary.

18. A system, comprising:
  one or more processors; and
  a memory coupled to the one or more processors and storing program instructions executable by the one or more processors to implement:
    accessing data representing a video clip;
    for a given frame of the video clip:
      dividing the frame into a plurality of tiles;
      for each of the plurality of tiles:
        generating a color frequency histogram for pixels of the tile; and
        computing a difference between the color frequency histogram of the tile and a color frequency histogram of a corresponding one of a plurality of tiles in an adjacent frame of the video clip;
      computing a descriptor for the given frame dependent on the computed differences between the plurality of tiles in the given frame and the plurality of tiles in the adjacent frame;
      determining a divergence type for the given frame dependent on the computed descriptor and computed descriptors of two or more other frames; and
      storing an indication of the divergence type for subsequent use.

19. The system of claim 18, wherein the two or more other frames comprise two or more frames leading the given frame in sequence in the video clip or two or more frames trailing the given frame in sequence in the video clip.

20. The system of claim 18, wherein said computing a descriptor comprises computing an average of the computed differences between the plurality of tiles in the given frame and the plurality of tiles in the adjacent frame.

21. The system of claim 18, wherein said determining a divergence type comprises determining an average of the computed descriptors of the two or more other frames.

22. The system of claim 21, wherein said determining a divergence type comprises determining if a normal-shaped divergence spike or a single-sided divergence spike exists at the given frame dependent on the computed descriptor of the given frame and the average of the computed descriptors of the two or more other frames.

23. The system of claim 22, wherein said determining a divergence type further comprises, in response to determining that a normal-shaped divergence spike or a single-sided divergence spike exists at the given frame:
  determining if the spike existing at the given frame represents one of a plurality of divergence types other than a shot boundary; and
  in response to determining that the spike existing at the given frame does not represent one of the plurality of divergence types other than a shot boundary, determining that the spike existing at the given frame represents a shot boundary.

24. The system of claim 18, wherein the one or more processors comprise at least one of a general-purpose central processing unit (CPU) or a graphics processing unit (GPU).

* * * * *